US007744668B2

(12) United States Patent
Oh et al.

(10) Patent No.: US 7,744,668 B2
(45) Date of Patent: Jun. 29, 2010

(54) MULTI-CYCLONE DUST SEPARATING APPARATUS OF VACUUM CLEANER

(75) Inventors: Jank-keun Oh, Gwangju (KR); Min-ha Kim, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 305 days.

(21) Appl. No.: 12/077,129

(22) Filed: Mar. 17, 2008

(65) Prior Publication Data

US 2009/0113859 A1 May 7, 2009

Related U.S. Application Data

(60) Provisional application No. 61/001,887, filed on Nov. 5, 2007.

(30) Foreign Application Priority Data

Feb. 14, 2008 (KR) ..................... 10-2008-0013556

(51) Int. Cl.
*B01D 45/00* (2006.01)

(52) U.S. Cl. ............................ 55/343; 55/345; 55/337; 55/346; 55/424; 55/447; 55/456; 55/DIG. 3; 15/352; 15/353

(58) Field of Classification Search ................... 55/337, 55/345, 343, 346, 424, 447, 456, DIG. 3; 15/352, 353
See application file for complete search history.

(56) References Cited

U.S. PATENT DOCUMENTS 5,078,761 A 1/1992 Dyson ......................... 55/213
7,419,521 B2 * 9/2008 Oh et al. ....................... 55/337

FOREIGN PATENT DOCUMENTS

| | | |
|---|---|---|
| EP | 0728435 | 8/1996 |
| GB | 2360719 | 10/2001 |
| GB | 2376195 | 12/2002 |
| GB | 2426474 | 11/2006 |
| GB | 2440125 | 1/2008 |
| GB | 2445211 | 7/2008 |
| KR | 1020070088223 | 8/2007 |
| WO | 2006/026414 | 3/2006 |

OTHER PUBLICATIONS

British Combined Search and Examination Report dated Dec. 10, 2008 corresponding to Application No. GB0815002.1.

* cited by examiner

*Primary Examiner*—Jason M Greene
*Assistant Examiner*—Dung Bui
(74) *Attorney, Agent, or Firm*—Ohlandt, Greeley, Ruggiero & Perle, L.L.P.

(57) ABSTRACT

The multi-cyclone dust separating apparatus includes a first cyclone unit including a first outer tub with a first air inlet and a cylindrical element with a first air outlet, and whirling air from the first air inlet to separate dust therefrom, the cylindrical element being disposed in the first outer tub to form a first cyclone chamber, along with the first outer tub; a second cyclone unit including a plurality of cyclones, each having a second air inlet for drawing in dust-laden air from the first cyclone chamber, to provide a second dust separation; and a dust bin including a first dust collecting chamber for collecting the dust separated by the first cyclone unit and a plurality of second dust collecting chambers for collecting the dust separated by the second cyclone unit.

11 Claims, 7 Drawing Sheets

100

MULTI-CYCLONE DUST SEPARATING APPARATUS OF VACUUM CLEANER

CROSS-REFERENCE TO RELATED APPLICATIONS

This application claims the benefit under 35 U.S.C. §119 from U.S. Provisional Patent Application No. 61/001,887, filed Nov. 5, 2007, in the United States Patent and Trademark Office, and Korean Patent Application No. 10-2008-13556, filed on Feb. 14, 2008, in the Korean Intellectual Property Office, the entire disclosures of both of which are incorporated herein by reference.

BACKGROUND OF THE INVENTION

1. Field of the Invention

The present disclosure relates to a dust separating apparatus, and, more particularly, to a multi-cyclone dust separating apparatus of a vacuum cleaner, which draws in air and separates dust or dirt from the air.

2. Description of the Related Art

In general, a dust collecting apparatus of a vacuum cleaner can be classified as either a dust collecting apparatus, which uses a filter, or a cyclone dust collecting apparatus, which separates dust from the air by centrifugal force. The term “dust” is used herein to refer collectively to dust, dirt, particulates, debris, and other similar matter that can be entrained with the air suctioned by the vacuum cleaner. The cyclone dust collecting apparatus can be further classified into a single cyclone dust collecting apparatus, which separates the dust by using a single cyclone or a multi-cyclone dust collecting apparatus, which separates the dust in two steps, by using more than one cyclone.

Conventional cyclone dust collecting apparatuses are disclosed in Korean Patent Nos. 645375 and 437156 to the present applicant and International Patent Publication No. WO 02/067750 to Dyson. The cyclone dust collecting apparatus disclosed in Korean Patent No. 645375 includes a first cyclone and a plurality of second cyclones disposed adjacent to an outer circumferential surface of the first cyclone. The dust collecting apparatus has a reduced height but a relatively larger outer diameter due to the cyclones disposed adjacent to the outer circumferential surface of the first cyclone.

The cyclone dust collecting apparatus disclosed in Korean Patent No. 437156 has a second cyclone that is disposed in a first cyclone and has a reduced outer diameter. However, because the air to the second cyclone is drawn in through a single air inlet, a whirling force of the second cyclone is weakened. In addition, to dump the collected dust, a user has to move the entire dust collecting apparatus to a trash can. Also, because the first and the second cyclone are neither separated nor subdivided into respective components, cleaning the inner parts of the dust collecting apparatus, maintaining the dust collecting apparatus, and repairing the dust collecting apparatus is difficult.

The cyclone dust collecting apparatus disclosed in International Patent Publication No. WO 02/067750 has a height that prevents it from being applied to a canister vacuum cleaner. In addition, to dump the collected dust, the user has to move the entire the dust collecting apparatus to a trash can.

SUMMARY OF THE INVENTION

In light of these difficulties, the present disclosure provides a multi-cyclone dust separating apparatus capable of easily dumping dust collected therein while being compact with a small outer diameter. The multi-cyclone dust separating apparatus also improves a separating efficiency for minute dust in a second cyclone unit while being compact. Further, the multi-cyclone dust separating apparatus facilitates cleaning, maintenance, and repair for components therein.

An embodiment of the present disclosure provides a multi-cyclone dust separating apparatus. The multi-cyclone dust separating apparatus includes a first cyclone unit including a first outer tub with a first air inlet and a cylindrical element with a first air outlet, and whirling air from the first air inlet to separate dust from the air, the cylindrical element being disposed in the first outer tub to form a first cyclone chamber, which is a space for whirling the air, along with the first outer tub; a second cyclone unit including a plurality of cyclones, each of which have a second air inlet for drawing in the air from which the dust is separated in the first cyclone chamber, to provide a second separation of dust from the air; and a dust bin including a first dust collecting chamber for collecting the dust separated by the first cyclone unit and a plurality of second dust collecting chambers for collecting the dust separated by the second cyclone unit. The second cyclone unit is disposed in the cylindrical element of the first cyclone unit and the plurality of second dust collecting chambers of the dust bin is separately formed and connected with the corresponding cyclones of the second cyclone unit, respectively.

Here, the first cyclone unit and the second cyclone unit may be adapted to be substantially concentric.

The first air outlet of the cylindrical element of the first cyclone unit may be adapted to be disposed to face the second air inlets of the plurality of cyclones.

The first cyclone unit may further include a grill member adapted to be disposed in the first air outlet of the cylindrical element of to restrain the air from which the dust is separated in the first cyclone chamber from directly being drawn into the second air inlets of the plurality of cyclones.

The first cyclone unit may further include a skirt member adapted to be disposed just below the first air outlet of the cylindrical element thereof. Preferably, but not necessarily, the skirt member may be formed of an elastic material, so that it can be curved or bent by an external force.

The second cyclone unit may further includes an air stagnating space formed above the plurality of cyclones, so that the air discharged from the plurality of cyclone is mixed up. With the air stagnating space, separating efficiency for minute dust can be more improved, and swirling phenomenon, which is generable at a place where respective discharging passages are met, can be reduced.

The dust bin may include a second outer tub to form the first dust collecting chamber, and a plurality of cylinder members disposed in the second outer tub to from the plurality of second dust collecting chambers, respectively. In this case, preferably, but not necessarily, the second outer tub may be formed, so that at least a portion of a top end thereof is located at the same height as or below the skirt member. Also, preferably, but not necessarily, the plurality of cylinder members may be made up of more than two cylinder members, each of which detachably coupled with a lower part of at least one of the plurality of cyclones.

BRIEF DESCRIPTION OF THE DRAWING FIGURES

The above aspects and other advantages of the present disclosure will be more apparent by describing exemplary embodiments of the present disclosure with reference to the accompanying figures, in which.

In the figures, it should be understood that like reference numerals refer to like features.

DETAILED DESCRIPTION OF AN EXEMPLARY EMBODIMENT

Hereinafter, a multi-cyclone dust separating apparatus according to exemplary embodiments of the present disclosure will now be described in greater detail with reference to the accompanying drawings.

Figure 1:
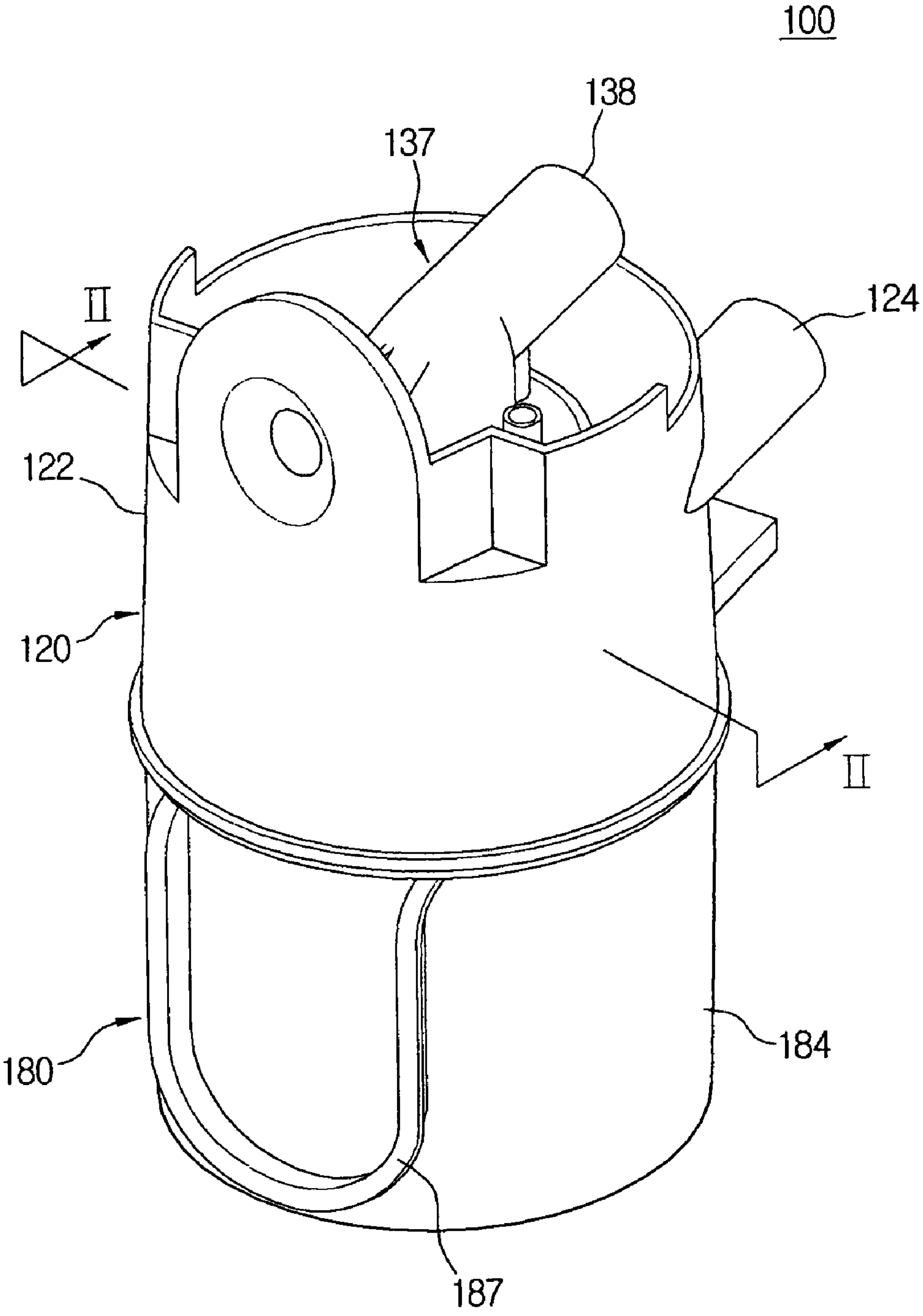
FIG. 1 is a perspective view exemplifying a multi-cyclone dust separating apparatus according to a first exemplary embodiment of the present disclosure.
Figure 2:
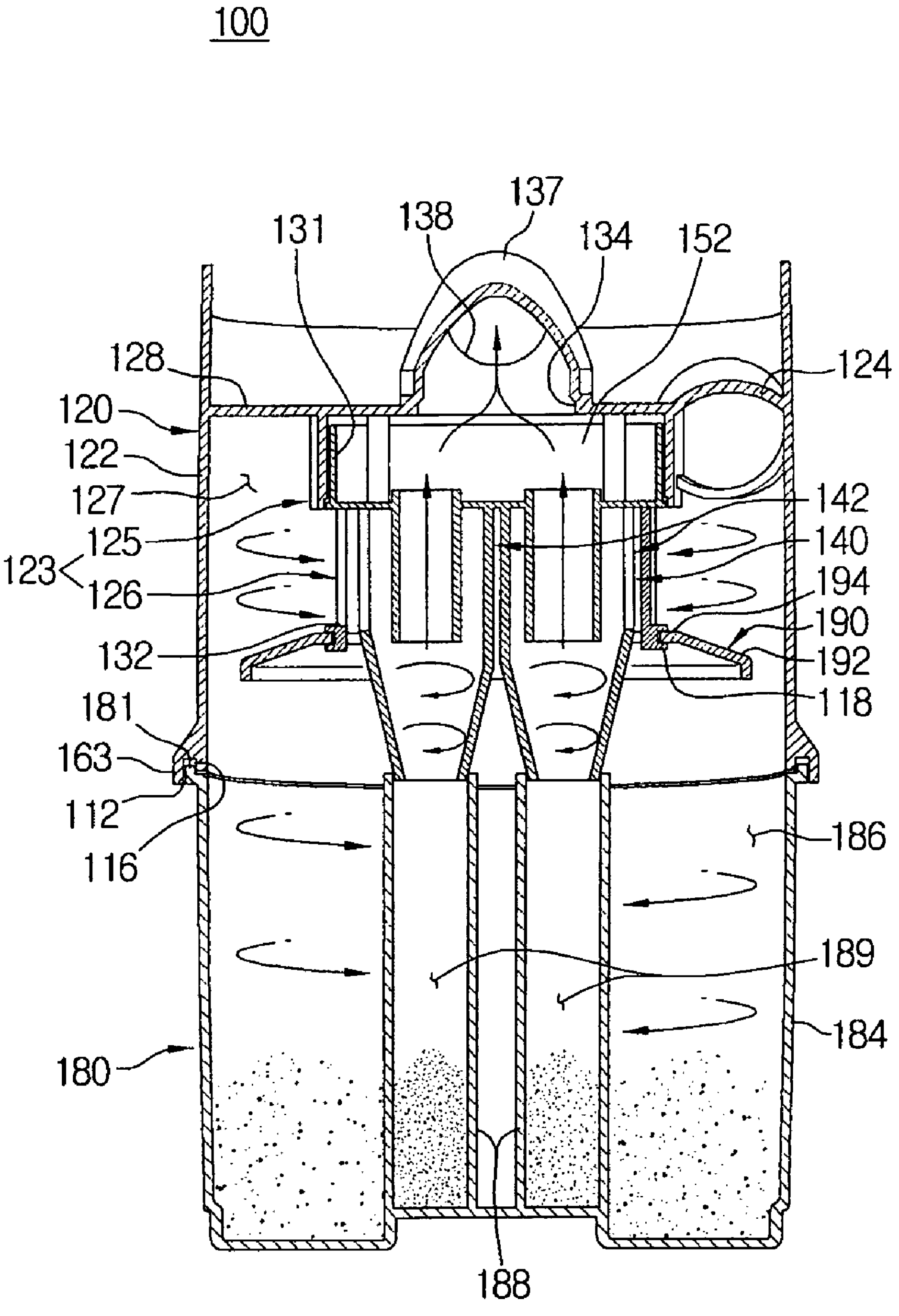
FIG. 2 is a cross-sectional view of the multi-cyclone dust separating apparatus taken along line II-II of FIG. 1.
Figure 3:
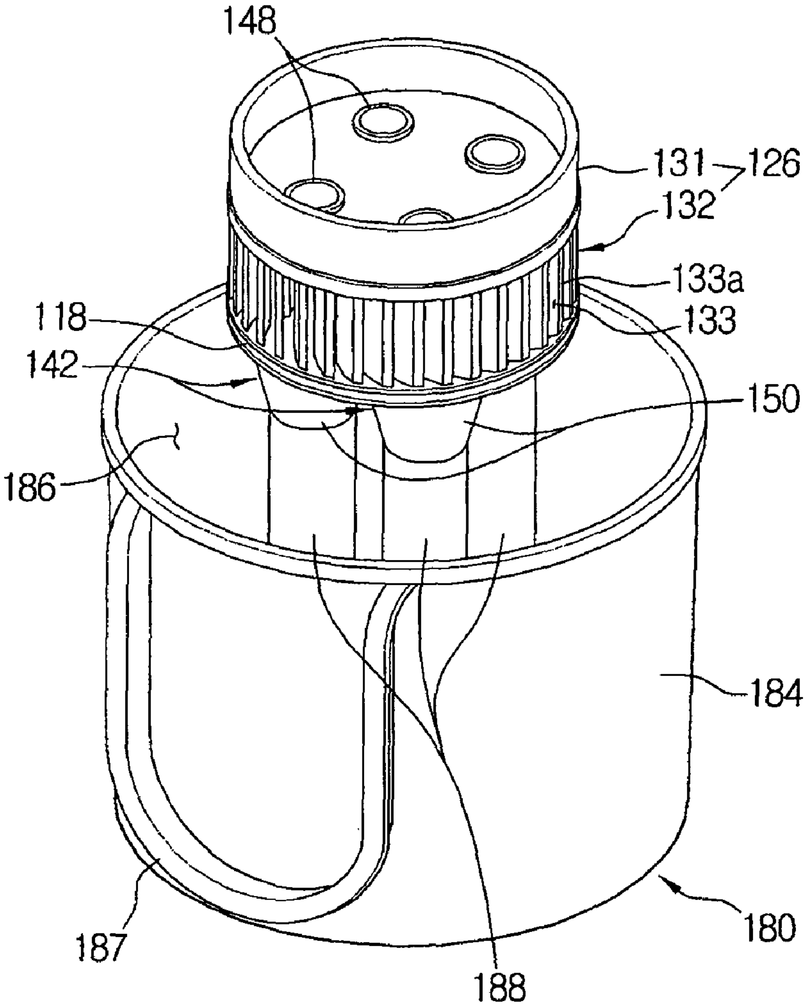
FIG. 3 is a partial perspective view exemplifying the multi-cyclone dust separating apparatus of FIG. 1 from which a first outer tub of a first cyclone unit is omitted.
Figure 4:
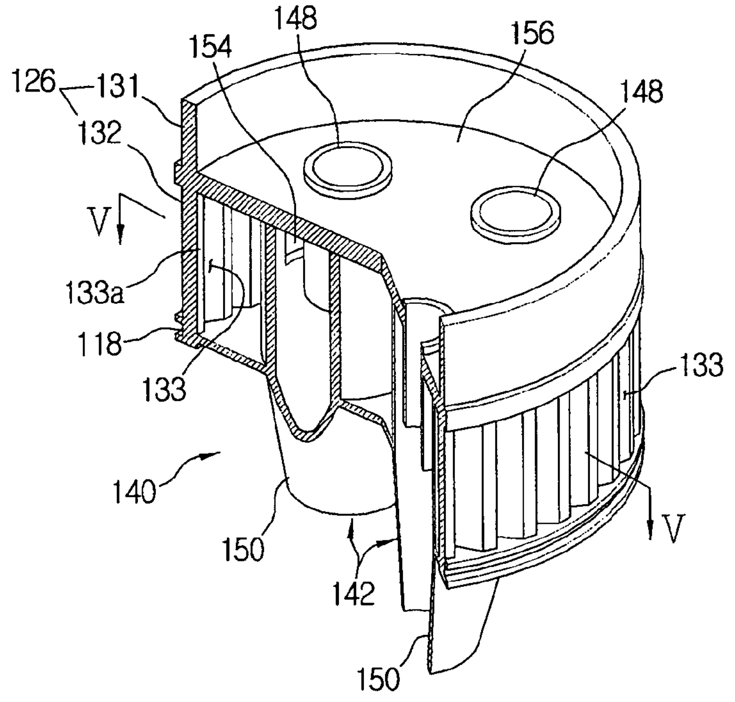
FIG. 4 is a partial cut-away perspective view exemplifying only a second cyclone unit of the multi-cyclone dust separating apparatus of FIG. 1.
Figure 5:
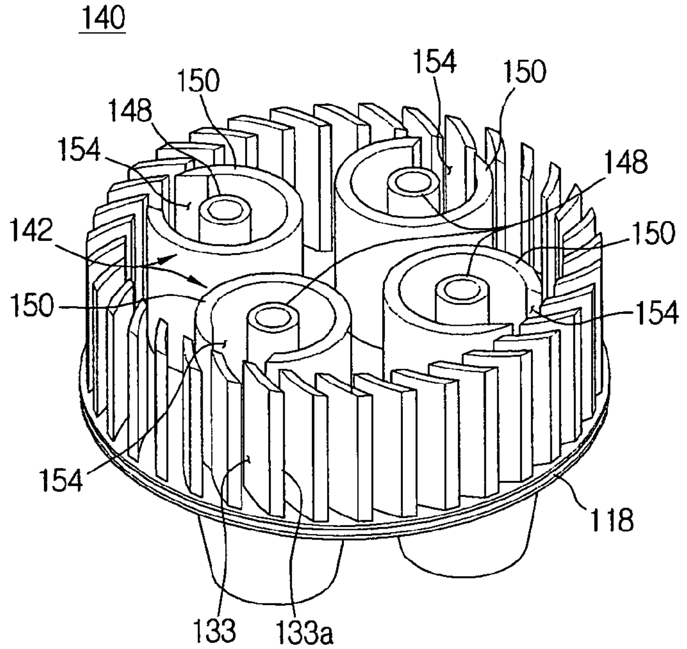
FIG. 5 is a partial cut-away perspective view of the second cyclone unit taken along line V-V of FIG. 4.
Figure 6:
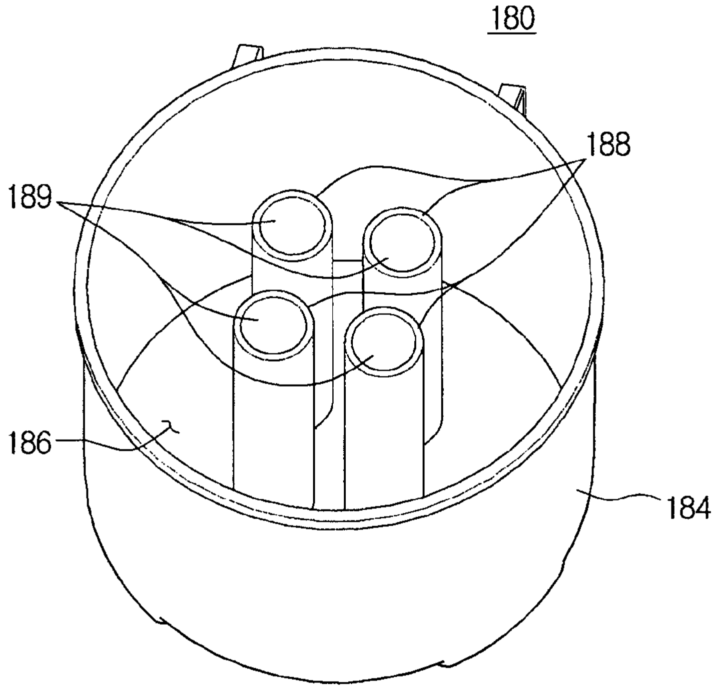
FIG. 6 is a perspective view exemplifying a dust bin of the multi-cyclone dust separating apparatus of FIG. 1.

FIGS. 1 through 6 show a multi-cyclone dust separating apparatus according to a first exemplary embodiment of the present disclosure. Particularly, FIG. 1 is an appearance perspective view, FIG. 2 is a cross-sectional view taken along line II-II of FIG. 1, FIG. 3 is a partial perspective view of the multi-cyclone dust separating apparatus of FIG. 1 from which a first outer tub of a first cyclone unit is omitted, FIGS. 4 and 5 are partial cut-away perspective views exemplifying only a second cyclone unit of the multi-cyclone dust separating apparatus of FIG. 1, and FIG. 6 is a perspective view exemplifying a dust bin of the multi-cyclone dust separating apparatus of FIG. 1.

Referring to FIGS. 1 and 2, the multi-cyclone dust separating apparatus 100 apparatus according to the first exemplary embodiment of the present disclosure may include a first cyclone unit 120, a second cyclone unit 140 and a dust bin 180.

The first cyclone unit 120 provides a first separation of dust from air, and it may include a first outer tub 122 and a cylindrical element 123. The first outer tub 122 may have a cylindrical shape with a constant vertical diameter. However, a varying vertical diameter is also within the scope of the present disclosure. An extended part 163 extends radially outward from a lower end of the first outer tub 122. The extended part 163 may form a first groove 112 therein. A rubber ring 116 may be mounted in the first groove 112. An inserting part 181 may be formed on an upper end of a second outer tub 184 of the dust bin 180. The inserting part 181 may be received in the first groove 112, so that the first outer tub 122 and the second outer tub 184 of the dust bin 180 are coupled to each other. A rubber ring 116 may be mounted in the first groove 112 and may seal the joined portions between the first and the second outer tubs 122 and 184.

The first outer tubs 122 may have a first air inlet 124 formed in the substantial shape of a circle at one side of the first outer tubs 122. The first air inlet 124 may be formed tangentially to the one side of the first outer tubs 122 so that air drawn into a first cyclone chamber 127 can flow along an inner wall of the first outer tubs 122 to form a whirling motion.

The cylindrical element 123 may be disposed below a center of a top wall 128 in the first outer tub 122. The cylindrical element 123 forms the first cyclone chamber 127 along with the first outer tub 122. The first cyclone chamber 127 may be a space in which air drawn in through the first air inlet 124 whirls. While the drawn-in air whirls in the first cyclone chamber 127, dust may be separated from the air by a centrifugal force and then fall downward due to its own weight into a first dust collecting chamber 186 of the second outer tub 184 of the dust bin 180.

The cylindrical element 123 may include a first part 125 and a second part 126. The first part 125 may be integrally formed with the top wall 128 under the top wall 128 of the first outer tub 122, and the second part 126 at an upper part thereof may be inserted into and coupled in the first part 125.

As illustrated in FIGS. 3 and 4, the second part 126 may include an upper portion 131 inserted in the first part 125, and a lower portion 132 with a first air inlet 133 of the second part 126. Preferably, but not necessarily, a grill member 133*a* may be installed in the first air inlet 133 so that the air from which the dust is separated in the first cyclone chamber 127 can be restrained from being directly drawn into second air inlets 154 of cyclones 142, which will be described below.

As illustrated in FIG. 2, a skirt member 190 may be disposed just below the first air outlet 133 in which the grill member 133*a* is installed. The skirt member 190 may have a connecting part 194 inserted in a second groove 118 formed on a lower circumferential surface of the second part 126 and an inclined part 192, which is diagonally inclined.

The skirt member 190 may be formed of an elastic material. In the present embodiment, the skirt member 190 is formed of rubber. Because the skirt member 190 may be downwardly inclined, it can be deformed by a downwardly pushing force but is not substantially deformed by an upwardly pushing force. Thus, large-sized dust, such as a coin, a cap or the like, can be collected in the dust bin 180 by deflecting the skirt member 190 downward, but the skirt member 190 effectively prevents the dust from flowing backwards from the dust bin 180. After being deflected, the skirt member 190 may elastically return to its original state by its own elastic force.

Referring to FIGS. 2, 4 and 5, the second cyclone unit 140 is adapted to be substantially concentric with the first cyclone unit 120 within the cylindrical element 123 installed in the center of the first cyclone chamber 127. The second cyclone unit 140 provides a second separation of dust from the air and thus improves dust separating efficiency. The second cyclone unit 140 may include a plurality of cyclones 142 and an air stagnating space 152.

In the embodiment depicted, the plurality of cyclones 142 is configured\ so that four cyclones 142 are disposed next to each other in parallel at intervals of 90°. The four cyclones 142 of the second cyclone unit 40 have similar size and height with respect to each other. The number of cyclones 142 illustrated is exemplary only and is not intended to be limiting; the optimal number of cyclones 142 may be less or more than the four cyclones 142 depicted in FIG. 5. Because the second cyclone unit 140 including the four cyclones 142 may be inserted into and disposed within the cylindrical element 123 of the first cyclone unit 120 to separate the dust in multi-stages, the multi-cyclone dust separating apparatus 100 improves in dust separating efficiency, but does not increase in volume, thereby maintaining a compact size.

Each of the cyclones 142 may include a cyclone body 150, a second air inlet 154, and a discharging pipe 148.

The cyclone body 150 may have an upper part formed substantially as a cylinder and disposed within the lower portion 132 of the second part 123 and a lower part formed substantially as a reverse cone and projected downward from the lower portion 132. As illustrated in FIG. 5, the second air inlet 154 may be formed to penetrate a portion of the upper part of the cyclone body 150 in a rectangular shape. In the embodiment depicted, four second air inlets 154, each of which is formed in each of the cyclone bodies 150 of the four cyclones 142, are arranged in intervals of 90°. Preferably, but not necessarily, the second air inlets 154 are also arranged to face the grill member 133*a* of the first air inlet 133 formed in the lower portion 132 of the second part 126 of the cylindrical element 123.

The discharging pipe 148 may be formed as a cylindrical pipe to act as a second air outlet of the cyclone 142, and may have one end disposed to penetrate an upper wall 156 of the lower portion 132 and another end disposed to penetrate the inside of the cyclone body 150. A lower end of the discharging pipe 148 may extend to where a shape of the cyclone body 150 changes. In particular, the discharging pipe 148 may extend to where the cylinder shape and the cone shape meet with each other.

Referring again to FIG. 2, the air stagnating space 152 may be disposed above the plurality of cyclones 142 to provide a space where air discharged from the cyclones 142 can be gathered. The air stagnating space 152 may be defined by the upper portion 131 of the second part 126 having an outer diameter smaller than the first part 125. A top part of the upper portion 131 of the second part 126 in which the air stagnating space 152 is formed may communicate in fluid with a discharging guide 137 through an opening 134 formed in the top wall 128 of the first outer tub 122. The discharging guide 137 may be a semi-cylinder member in fluid communication with the opening 134 and may have a third air outlet 138 to lead the air discharged through the opening 134 from the air stagnating space 152 to the outside of the multi-cyclone dust separating apparatus 100. Accordingly, the air discharged from the respective cyclones 142 is mixed in the air stagnating space 152, moved to the discharging guide 137 through the opening 134, and discharged to the outside of the multi-cyclone dust separating apparatus 100 through the third air outlet 138. Because the air may have time to stagnate in the large volume of the air stagnating space 152 as described above, the whirling motion of the air may decrease which may reduce noise caused by the whirling motion.

Referring to FIGS. 2 and 6, the dust bin 180 may include a second outer tub 184 and a plurality of cylinder members 188.

The second outer tub 184 may be a cylindrical member and may have the inserting part 181 (see FIG. 2) with a slightly enlarged outer diameter. The inserting part 181 may be inserted into the first groove 112 of the extended part 163 of the first cyclone unit 120, as described above. A handle 187 (see FIGS. 1 and 3) may be formed on an outer circumferential surface of the second outer tub 184 so that a user can grip the dust bin 180 and separate it from the first cyclone unit 120 and the second cyclone unit 140 disposed. The handle 187 may have a substantially U-shaped form.

The cylinder members 188 may be configured, so that four cylinder members 188 are formed opposite to the cyclone bodies 150 of the cyclones 142 within the second outer tub 184. Top ends of the cylinder members 188 may accommodate lower parts of the cyclone bodies 150, so that they can be coupled in fluid communication with the lower parts of the cyclone bodied 150. A space between the second outer tub 184 and the cylinder members 188 may form a first dust collecting chamber 186 in which the dust separated in the first cyclone chamber 127 is stored. Spaces formed in the cylinder members 188 may form a plurality of, that is, four second dust collecting chambers 189 in which fine dusts by the respective cyclone 142 are stored.

Figure 7:
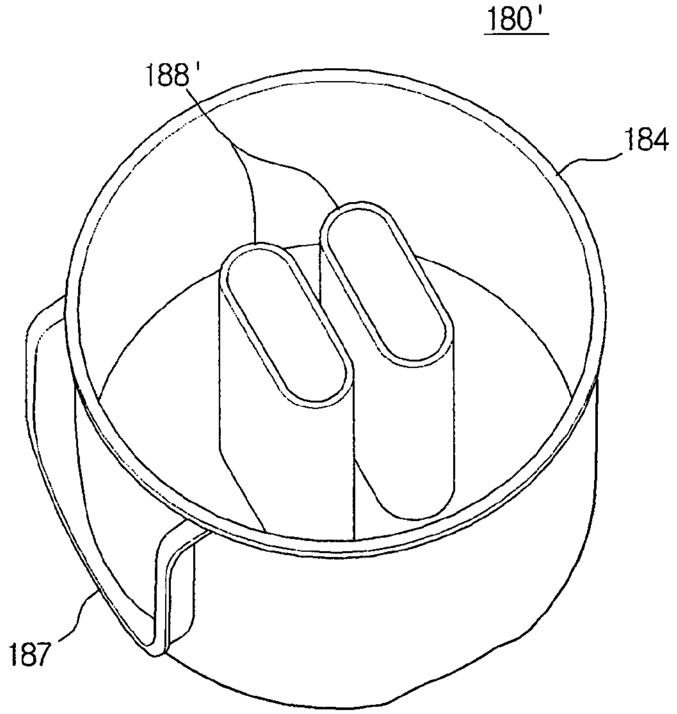
FIG. 7 is a perspective view exemplifying a modified example of the dust bin of the multi-cyclone dust separating apparatus of FIG. 1.

Alternatively, as illustrated in FIG. 7, a dust bin 180' may include two cylinder member 188', each of which is disposed to accommodate lower parts of cyclone bodies 150 of two cyclones 142 among the four cyclones 142.

Accordingly, the user can separate the dust bin 180 or 180' from the first cyclone unit 120 and the second cyclone unit 140 and carry only the dust bin 180 or 180' using the handle 187 formed on the second outer tub 184. Thus, the user can more conveniently dump the dust, without having to carry the entire multi-cyclone dust separating apparatus in order to dump the dust, like the conventional multi-cyclone dust separating apparatus.

Hereinafter, an operation of the multi-cyclone dust separating apparatus 100 according to the first exemplary embodiment of the present disclosure constructed as described above will be explained in detail with reference to FIGS. 1 through 6.

Referring to FIG. 2, external air may be drawn into the first cyclone chamber 127 through the first air inlet 124 formed in the first outer tub 122 of the first cyclone unit 120. Because the first air inlet 124 may be formed tangentially to the first outer tub 122 so that the air drawn into the first cyclone chamber 127 can flow along an inner wall of the first outer tub 122, the air may whirl about the cylindrical element 123 in the first cyclone chamber 127. Dust may then be separated from the air by a centrifugal force while the air whirls in the first cyclone chamber 127. Dust may be dashed against the inner surface of the first outer tub 122 and fall downward due to its own weight into the first dust collecting chamber 186 of the dust bin 180. Relatively larger-sized dust may fall downward into the first dust collecting chamber 186, particularly, large-sized dust, such as a coin, a cap or the like. As the dust falls downward, the dust may bend the skirt member 190 in a downward direction. Because the skirt member 190 may be made of an elastic material, the skirt member 190 may return to its original shape afterwards. The air from which the large-sized dust is separated may then be drawn into the cyclones 142 through the first air inlet 133 of the cylindrical element 123 and the four second air inlets 154 (shown in FIGS. 4 and 5) arranged in intervals of 90° at the upper parts of the cyclone bodies 150 of the cyclones 142, respectively. Minute dust may be separated from the drawn-in air while whirling about the second discharging pipe 148 in the cyclone bodies 150. The separated minute dust may fall downward into the second dust collecting chambers 189, and the air from which the minute dust is separated may be discharged into the air stagnating space 152 through the discharging pipes 148. Because the air stagnating space 152 may have a volume larger than the discharging pipes 148, the velocity of the air may rapidly decrease, and thus even a very small amount of minute dust riding along in the air flow may settle down on the upper wall 156 by its own weight. The air discharged from the cyclones 142 may be mixed with air in the air stagnating space 152 and then discharged to the outside of the dust separating apparatus 100 through the opening 134, the discharging guide 137 and the third air outlet 138. When a portion of the air whirling in the first cyclone chamber 127 flows down to the first dust collecting chamber 186, the dust collected in the first dust collecting chamber 186 may flow back towards the first cyclone chamber 127 by riding in the whirling air. However, the skirt member 190 may block the first cyclone chamber 127 from the first dust collecting chamber 186. For the second cyclone unit 140, because the lower parts of the cyclone bodies 150 are formed substantially as a cone, the lower end holes of the second cyclone bodies 150 provide only small openings through which dust can flow. Thus, minute dust collected in the second dust collecting chambers 189 is substantially prevented from flowing backwards through the lower end holes of the second cyclone bodies 150.

Also, in the conventional multi-cyclone dust separating apparatus, if the dust is to be dumped, the user has to transport the entire heavy dust separating apparatus to a trash can to dispose of the dust because the conventional multi-cyclone dust separating apparatus is large and has a bottom hatch that must be opened to dump the dust. However, the multi-cyclone dust separating apparatus according to the first embodiment of the present disclosure, may have a compact structure and the dust bin 180 may be separable from the first outer tub 122 and the second cyclone unit 140 so that the user only has to transport the dust bin 180 to the trash can to dump the dust and leave the heavier cyclone units in the vacuum cleaner.

Figure 8:
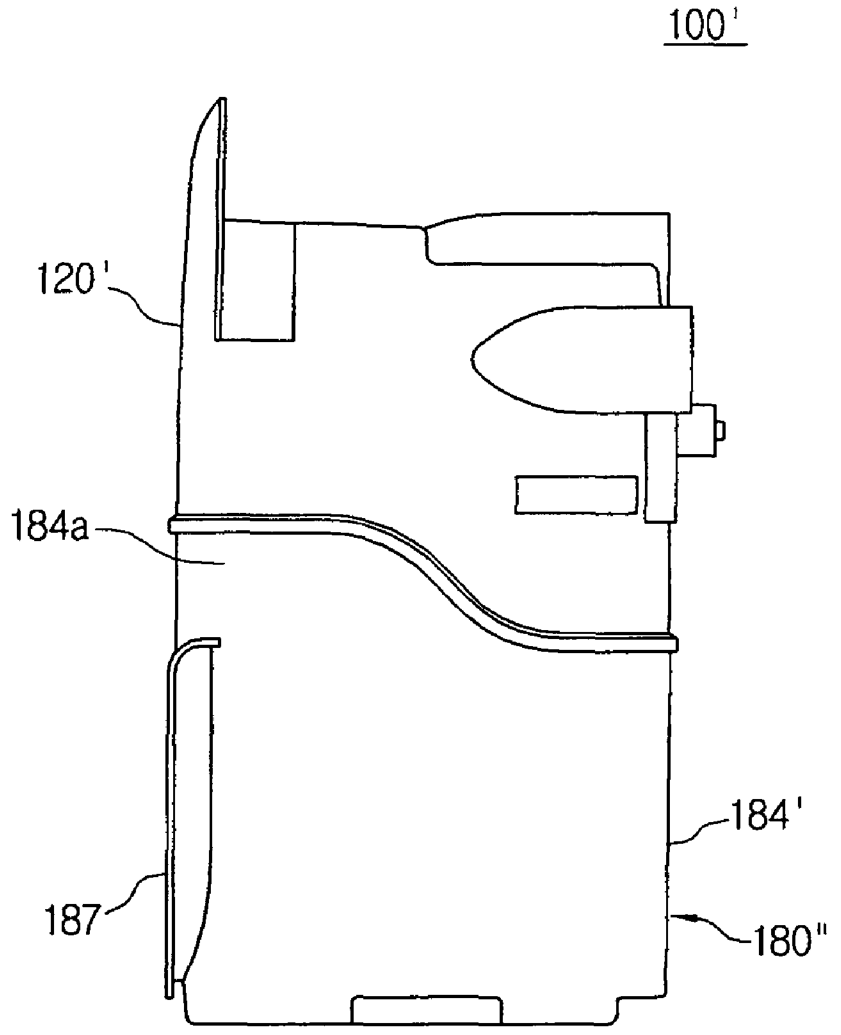
FIG. 8 is a perspective view exemplifying a multi-cyclone dust separating apparatus according to a second exemplary embodiment of the present disclosure.
Figure 9:
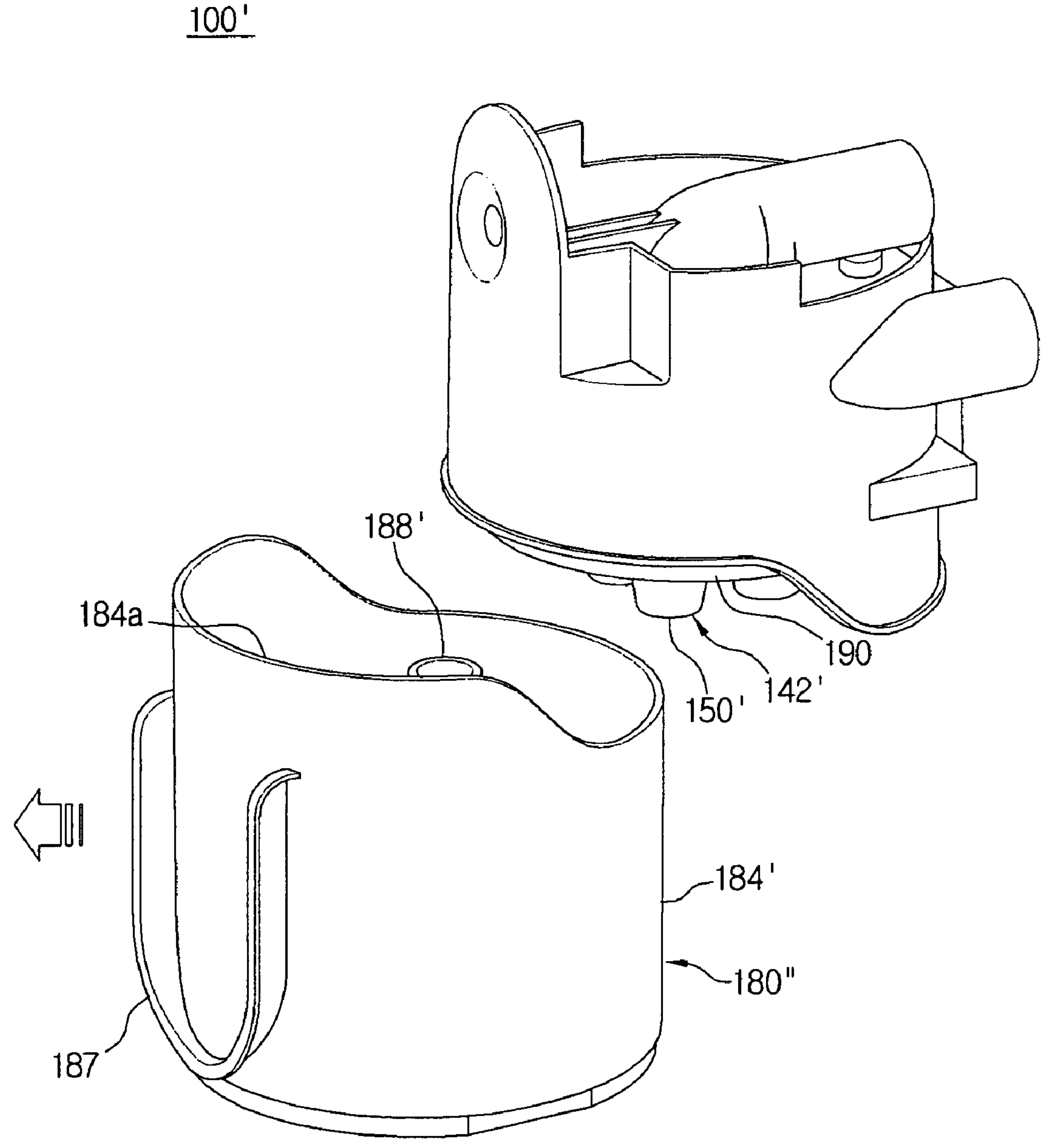
FIG. 9 is an exploded perspective view of the multi cyclone dust-separating apparatus of FIG. 8.

FIGS. 8 and 9 show a multi-cyclone dust separating apparatus 100' according to a second exemplary embodiment of the present disclosure.

The multi-cyclone dust separating apparatus 100' according to the second exemplary embodiment has the same construction as the multi-cyclone dust separating apparatus 100 explained with reference to FIGS. 1 through 6, except that a portion 184*a* of a top end of a second outer tub 184' of a dust bin 180" is extended to a height at which the skirt member 190 is located and top ends of cylinder members 188' do not accommodate lower end of cyclone bodies 150' of second cyclones 142', but comes only in contact with the lower end of the cyclone bodies 150' of the second cyclones 142'. Accordingly, as illustrated in FIG. 9, when the dust is to be dumped from the dust bin 180" in the multi-cyclone dust separating apparatus 100', the user can easily separate the dust bin 180" from a first cyclone unit 120' and a second cyclone unit only by pulling the second outer tub 184' in a direction of arrow while grasping the handle 187 formed on the second outer tub 184'.

Since an operation of the multi-cyclone dust separating apparatus 100' constructed as described above is similar to that of the multi-cyclone dust separating apparatus 100 explained with reference to FIGS. 1 through 6, detailed description thereof will be omitted.

As apparent from the foregoing description, according to the exemplary embodiments of the present disclosure, the multi-cyclone dust separating apparatus may be configured so that the second cyclone unit can be disposed in the cylindrical element of the first cyclone unit. Accordingly, the outer diameter of the multi-cyclone dust separating apparatus may be smaller, thereby allowing the multi-cyclone dust separating apparatus to have an overall compact size, even though the second cyclone unit includes the plurality of cyclones to increase the dust separating efficiency. Also, because the multi-cyclone dust separating apparatus according to the exemplary embodiments of the present disclosure may allow the dust bin to be easily separated from the first and the second cyclone units, unlike the conventional multi-cyclone dust separating apparatus, the user can separate only the dust bin to dump the dust collected in the multi-cyclone dust separating apparatus.

Further, the multi-cyclone dust separating apparatus according to the exemplary embodiments of the present disclosure may be configured so that the second air inlets may be formed in the cyclones of the second cyclone unit disposed in parallel, respectively, to allow the air to maintain the strong whirling force even in the second cyclone unit, thereby improving the dust separating efficiency for minute dust.

Moreover, the multi-cyclone dust separating apparatus according to the exemplary embodiments of the present disclosure may be configured to include the air stagnating space above the plurality of cyclones of the second cyclone unit, thereby reducing the whirling of the air and minimizing the associated noise.

Although representative embodiments of the present disclosure have been shown and described in order to exemplify the principles of the present disclosure, the present disclosure is not limited to the specific exemplary embodiments. It will be understood that various modifications and changes can be made by one skilled in the art without departing from the spirit and scope of the invention as defined by the appended claims. Therefore, it shall be considered that such modifications, changes, and equivalents thereof are all included within the scope of the present disclosure.

What is claimed is:

1. A multi-cyclone dust separating apparatus, comprising:

a first cyclone unit including a first outer tub with a first air inlet and a cylindrical element with a first air outlet, and whirling air from the first air inlet to separate dust from the air to effect a first separation of dust from air, the cylindrical element being disposed in the first outer tub to form a first cyclone chamber, which is a space for whirling the air, along with the first outer tub;

a second cyclone unit including a plurality of cyclones, each of which have a second air inlet for drawing in the air from which the dust is separated in the first cyclone chamber, to effect a second separation of dust from the air; and a dust bin including a first dust collecting chamber for collecting the dust separated by the first cyclone unit and a plurality of second dust collecting chambers for collecting the dust separated by the second cyclone unit, wherein the second cyclone unit is disposed completely within the cylindrical element of the first cyclone unit and the plurality of second dust collecting chambers of the dust bin is separately formed and connected with the corresponding cyclones of the second cyclone unit, respectively.

2. The multi-cyclone dust separating apparatus of claim 1, wherein the first cyclone unit and the second cyclone unit are substantially concentric.

3. The multi-cyclone dust separating apparatus of claim 1, wherein the first air outlet of the cylindrical element of the first cyclone unit is disposed to face the second air inlets of the plurality of cyclones.

4. The multi-cyclone dust separating apparatus of claim 3, wherein the first cyclone unit further comprises a grill member disposed in the first air outlet of the cylindrical element thereof to restrain the air from which the dust is separated in the first cyclone chamber from directly being drawn into the second air inlets of the plurality of cyclones.

5. The multi-cyclone dust separating apparatus of claim 1, wherein the first cyclone unit further comprises a grill member disposed in the first air outlet of the cylindrical element thereof to restrain the air from which the dust is separated in the first cyclone chamber from directly being drawn into the second air inlets of the plurality of cyclones.

6. The multi-cyclone dust separating apparatus of claim 1, wherein the first cyclone unit further comprises a skirt member disposed just below the first air outlet of the cylindrical element thereof.

7. The multi-cyclone dust separating apparatus of claim 6, wherein the skirt member is of an elastic material.

8. The multi-cyclone dust separating apparatus of claim 1, wherein the second cyclone unit further comprises an air stagnating space formed above the plurality of cyclones, so that the air discharged from the plurality of cyclone is mixed up.

9. The multi-cyclone dust separating apparatus of claim 6, wherein the dust bin further comprises:

a second outer tub to form the first dust collecting chamber; and a plurality of cylinder members disposed in the second outer tub to form the plurality of second dust collecting chambers, respectively.

10. The multi-cyclone dust separating apparatus of claim 9, wherein the second outer tub is formed so that at least a portion of a top end thereof is located at the same height as or below the skirt member.

11. The multi-cyclone dust separating apparatus of claim 9, wherein the plurality of cylinder members comprises more than two cylinder members, each of which is detachably coupled with a lower part of at least one of the plurality of cyclones.

* * * * *